United States Patent
Binstock et al.

(10) Patent No.: US 8,510,259 B2
(45) Date of Patent: Aug. 13, 2013

(54) XBRL DATABASE MAPPING SYSTEM AND METHOD

(75) Inventors: Cliff Binstock, Kirkland, WA (US); Brian Milnes, Mercer Island, WA (US)

(73) Assignee: XBRL Cloud, Inc., Port Townsend, WA (US)

( * ) Notice: Subject to any disclaimer, the term of this patent is extended or adjusted under 35 U.S.C. 154(b) by 17 days.

(21) Appl. No.: 13/424,308

(22) Filed: Mar. 19, 2012

(65) Prior Publication Data

US 2012/0239610 A1    Sep. 20, 2012

Related U.S. Application Data

(60) Provisional application No. 61/453,821, filed on Mar. 17, 2011.

(51) Int. Cl.
G06F 7/00  (2006.01)
G06F 17/30 (2006.01)

(52) U.S. Cl.
USPC .......................................... 707/602; 707/809

(58) Field of Classification Search
None
See application file for complete search history.

(56) References Cited

U.S. PATENT DOCUMENTS

| | | | |
|---|---|---|---|
| 7,822,769 B2 * | 10/2010 | Rohan et al. | 707/777 |
| 2003/0037038 A1 | 2/2003 | Block | |
| 2006/0242181 A1 | 10/2006 | Mueller-klingspor | |
| 2009/0006472 A1 | 1/2009 | Bush | |
| 2010/0121883 A1 | 5/2010 | Cutting | |
| 2012/0011118 A1 * | 1/2012 | Gleicher et al. | 707/736 |

OTHER PUBLICATIONS

XBRL in Plain English: A Simplified View on XBRL, Batavia XBRL BV, www.batavia-xbrl.com, 2006.*

* cited by examiner

*Primary Examiner* — Robert Beausoliel, Jr.
*Assistant Examiner* — Nirav K Khakhar
(74) *Attorney, Agent, or Firm* — ÆON Law; Adam L. K. Philipp

(57) ABSTRACT

XBRL instance data configured according to a given XBRL hypercube specification (or an extension thereof) may be automatically mapped to a multidimensional database configured according to the given XBRL hypercube specification. Such a multidimensional database may be configured for analytical processing of multi-dimensional analytical queries related to the XBRL instance data and/or for analytical processing by a business intelligence tool. Multidimensional data from a multidimensional database may also be automatically mapped to an automatically-generated XBRL hypercube specification structured according to the multidimensional database.

27 Claims, 14 Drawing Sheets

XBRL DATABASE MAPPING SYSTEM AND METHOD

CROSS-REFERENCE TO RELATED APPLICATIONS

This application claims the benefit of priority to U.S. Provisional Application No. 61/453,821, filed Mar. 17, 2011, titled "XBRL DATABASE MAPPING SYSTEM AND METHOD,", and naming inventors Cliff Binstock and Brian Milnes. The above-cited application is incorporated herein by reference in its entirety, for all purposes.

FIELD

The present disclosure relates to eXtensible Business Reporting Language ("XBRL"), and more particularly to systems and methods for processing, presenting, and/or mapping XBRL data to and/or from a multidimensional database.

BACKGROUND

XBRL is an open data standard for financial reporting. XBRL allows information modeling and the expression of semantic meaning commonly required in business reporting. XBRL uses Extensible Markup Language ("XML") syntax. XBRL is commonly used to define and exchange financial information, such as financial statements, corporate action filings, and the like. In the United States, the Securities and Exchange Commission ("SEC") requires certain entities to provide financial statements and other filings using XBRL.

In typical usage, XBRL consists of an instance document, containing primarily the business facts being reported, and one or more taxonomies, which capture definitions of individual reporting concepts, certain relationships between concepts, and other semantic meaning.

For example, the US Financial Reporting Taxonomy Framework ("USFRTF") is a collection of XBRL taxonomies that can be used to express the financial-statement-based reports of public and private companies across various industry sectors. The document, "US Financial Reporting Taxonomy Framework,"[1] summarizes information about the USFRTF and is incorporated by reference for all purposes.

[1] Available at http://www.xbrl.org/us/USFRTF/2005-02-28/US-FRTF%202005-02-28%20Explanatory%20Note.htm In addition, USFRTF includes several industry-layer taxonomies, including the us-gaap-ci taxonomy (commercial and industrial companies), us-gaap-basi (banking and savings institutions), us-gaap-ins (insurance entities), and the like. Such industry-layer taxonomies allow entities in particular industry categories to express industry-appropriate financial statements in XBRL.

USFRTF industry-layer taxonomies define various extended link "networks" containing concepts that make up various standard reports or forms. For example, the us-gaap-ci taxonomy includes, inter alia, a Statement of Financial Position network, an Income Statement network, and a Statement of Cash Flows network, which respectively contain concepts that make up balance sheets, income statements, and statements of cash flows.

However, very few entities use the standard industry-layer taxonomies unmodified. Rather, almost all entities add various taxonomy components by extending the USFRTF to suit their specific reporting needs. For example, the airlines industry might create an extension to the us-gaap-ci taxonomy, in which the concept "Airplanes" may be added as an extension of the standard concept "Property, Plant and Equipment." Thus, the networks included within the standard industry-layer taxonomies may be regarded as "templates" that are customarily extended to create entity-specific networks.

As discussed above, XBRL is extremely flexible, and almost every entity that uses XBRL for reporting is able to extend a standard taxonomy (e.g., the USFRTF) to customize it to suit that particular entity's needs. However, this flexibility and entity-specific customization can make it difficult to compare and/or analyze filings across many entities in an industry.

DESCRIPTION

Figure 1:
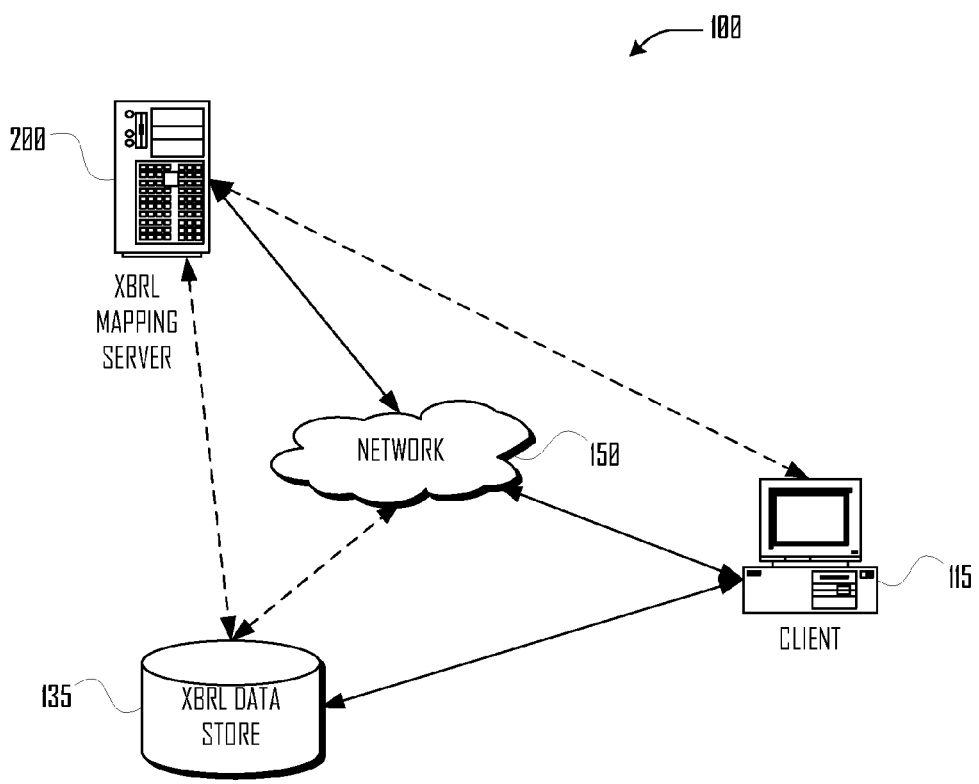
FIG. 1 illustrates an exemplary XBRL processing system in accordance with one embodiment.

Various embodiments may provide methods for automatically mapping XBRL instance documents to an automatically generated, standardized database configured for analytical processing of multi-dimensional queries to analyze, for one example, key performance indicators ("KPIs") in the industry. Although embodiments are described using illustrative taxonomies taken from USFRTF, other embodiments are equally applicable to similar taxonomies outside the United States.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers, and memory storage devices. Each of these conventional distributed computing components is accessible by the processor via a communication network.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

FIG. 1 illustrates an exemplary XBRL processing system 100 in which a client device 115 and an XBRL mapping server 200 are connected to a network 150. Additionally, client device 115 is connected to an XBRL data store 135, either locally, via an optional connection to network 150, or via another connection (not shown). In some embodiments, XBRL mapping server 200 may also be connected to XBRL data store 135. In some embodiments, XBRL data store 135 may comprise a local and/or remote database; a local and/or remote storage medium connected via a storage area network ("SAN"), a high speed serial bus, and/or via other suitable communication technology; a local and/or remote business intelligence system; and the like. In some embodiments, some or all of XBRL mapping server 200, client device 115, and/or XBRL data store 135 may be incorporated into a single logical or physical device.

In various embodiments, network 150 may include the Internet, a local area network ("LAN"), a wide area network ("WAN"), and/or other data network. In many embodiments, there may be multiple client devices 115, multiple XBRL data stores 135, and/or multiple XBRL processing servers 200.

Figure 2:
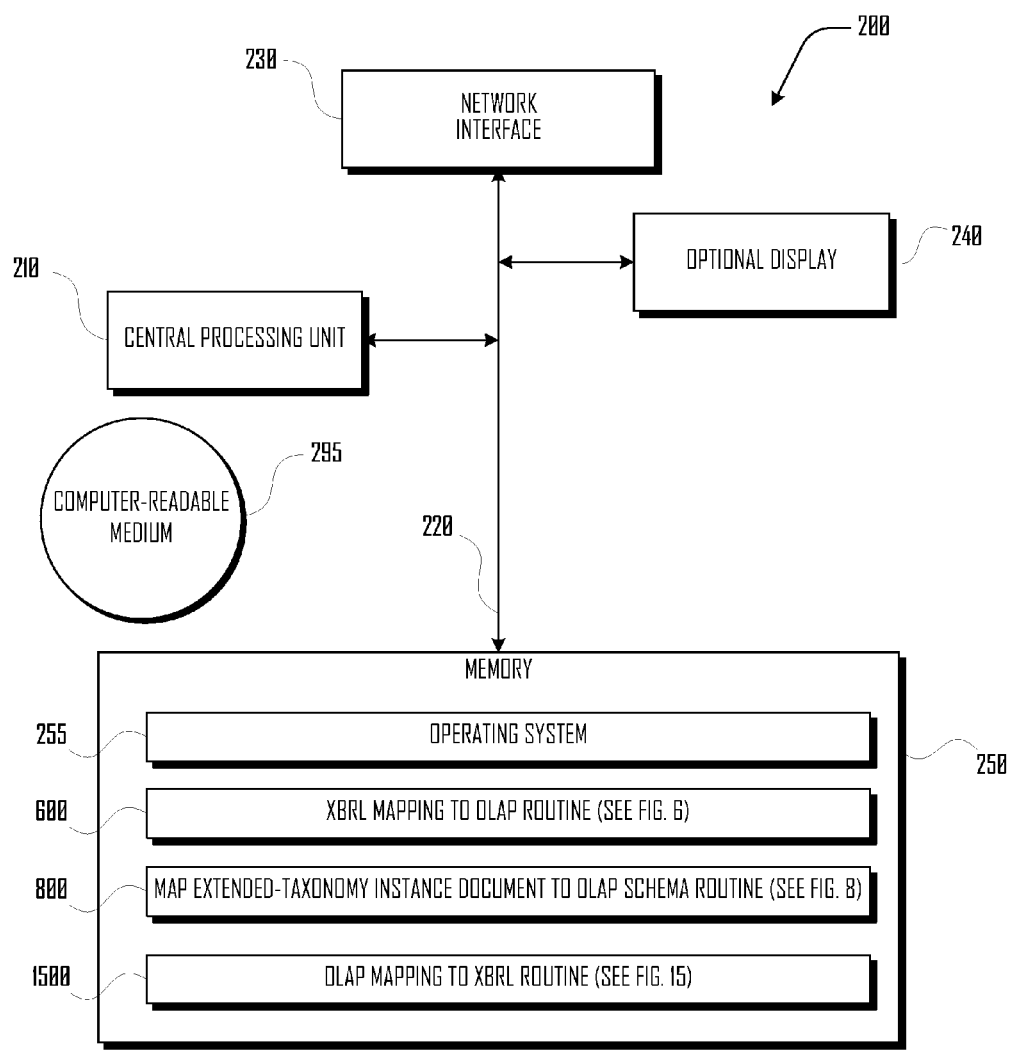
FIG. 2 illustrates several components of an exemplary XBRL mapping server in accordance with one embodiment.

FIG. 2 illustrates several components of an exemplary XBRL mapping server 200 in accordance with one embodiment. In some embodiments, XBRL mapping server 200 may include many more components than those shown in FIG. 2. However, it is not necessary that all of these generally conventional components be shown in order to disclose an illustrative embodiment. As shown in FIG. 2, the XBRL mapping server 200 includes a communication interface 205 for connecting to, e.g., the network 150.

The XBRL mapping server 200 also includes a processing unit 210, a memory 250, and an optional display 240, all interconnected along with the communication interface 205 via a bus 220. The memory 250 generally comprises a random access memory ("RAM"), a read only memory ("ROM"), and a permanent mass storage device, such as a disk drive. The memory 250 stores program code for a XBRL mapping routine 800. In addition, the memory 250 also stores an operating system 255. These software components may be loaded from a computer readable storage medium 295 into memory 250 of the XBRL mapping server 200 using a drive mechanism (not shown) associated with a computer readable storage medium, such as a floppy disc, tape, DVD/CD-ROM drive, memory card, or the like. In some embodiments, software components may also be loaded via the communication interface 205, rather than via a computer readable storage medium 295.

Although an exemplary XBRL mapping server 200 has been described that generally conforms to conventional general purpose computing devices, an XBRL mapping server 200 may be any of a great number of devices capable of communicating with the network 150 and/or client device 115, for example, a personal computer, a game console, a set-top box, a handheld computer, a cell phone, or any other device that is capable of processing XBRL data.

Figure 3:
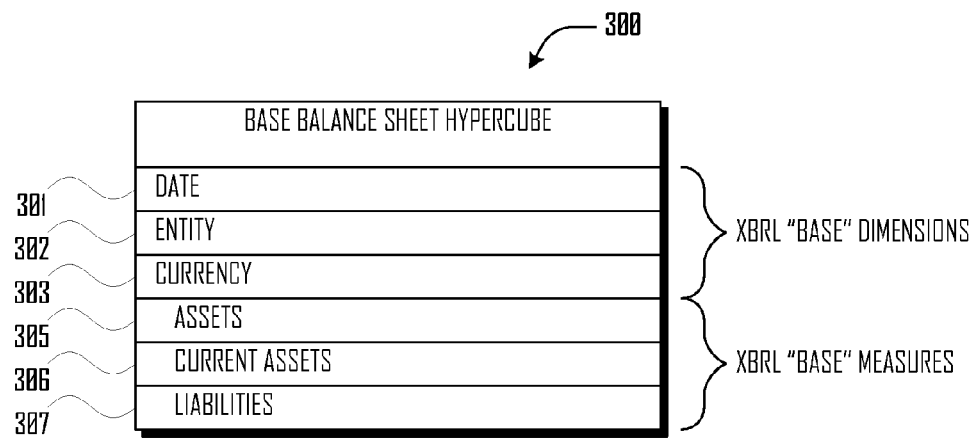
FIGS. 3-4 illustrate elements comprising exemplary XBRL hypercubes in accordance with one embodiment.

FIG. 3 illustrates elements comprising an exemplary base XBRL hypercube 300 that will be used to illustrate various features and processes set out below. Hypercube 300 includes concepts 301-303 and 305-307 that make up a simplified base industry-layer balance sheet. Specifically, hypercube 300 includes XBRL base dimensions (date 301, entity 302, and currency 303) and XBRL base measures or primary items (assets 305, current assets 306, and liabilities 307).

In general usage, dimensions in XBRL are used to structure contextual information for business facts. Multiple dimensions may be defined in a taxonomy using structures called "hypercubes," such as base hypercube 300.

However, as the term is used herein, an XBRL "dimension" is used expansively to refer to any XBRL element that may be inferred to be the functional equivalent of a "proper" XBRL dimension (i.e., a dimensional entity defined according to the XBRL 2.1 specification, the XBRL Dimensions 1.0 Specification, or the like). For example, the XBRL 2.1 specification defines various "built-in" context and unit elements (e.g., date, entity, currency, and the like) that are not technically referred to as XBRL "dimensions," in that such elements are not defined according to the XBRL Dimensions Specification. However, such built-in context and unit elements are considered to be functionally equivalent to "proper" XBRL dimensions and are included within the scope of the term XBRL "dimension" as used in the present disclosure. As used herein, the term XBRL "dimension" encompasses typed (non-enumerable) and explicit (enumerable) dimensions, as well as tuples (facts holding multiple values, represented by a single XML element containing nested items or other tuples). Thus, in some embodiments, operations that are described to operate on "dimension:member pairs" (or similar terms related to explicit, enumerable XBRL dimensions) may also operate equivalently on tuple:index pairs and/or dimension: unrestricted-value pairs.

Moreover, in many taxonomies, there are concepts (potential measures or primary items) with zero "proper" dimensions, including concepts that are attached to empty hypercubes (hypercubes with no "proper" dimensions). However, in various embodiments, even empty hypercubes are deemed to have one or more dimensions (as the term is used expansively) corresponding to at least the "built-in" context and unit elements (e.g., date, entity, currency, and the like) defined in the XBRL 2.1 specification. Thus, various embodiments may handle XBRL elements that lack literal or technical dimensions by treating concepts that are defined outside of hypercubes as being attached to empty hypercubes, and by treating empty hypercubes as having "dimensions" (expansive) corresponding to at least "built-in" context and unit elements.

Figure 4:
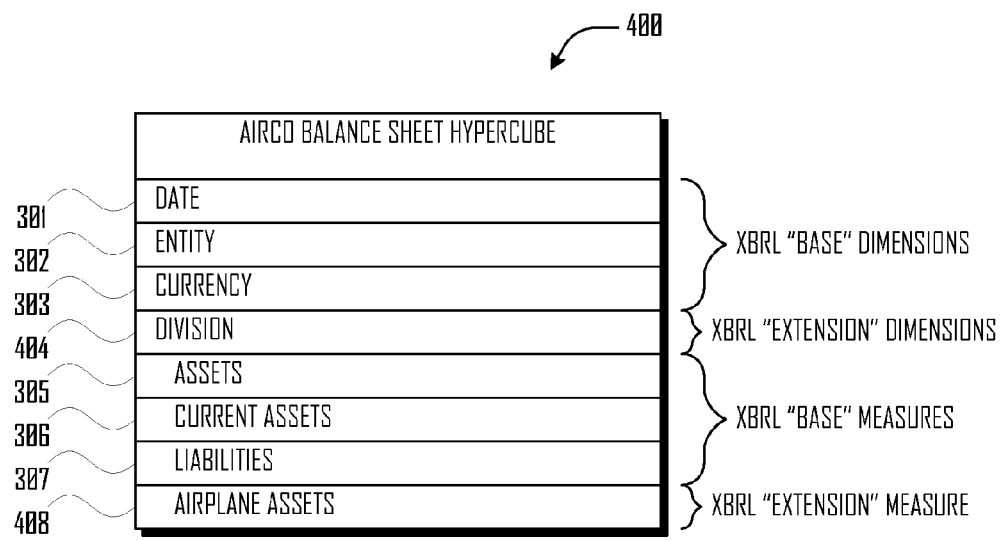

FIG. 4 illustrates elements comprising an exemplary extended XBRL hypercube 400 that will be used to illustrate various features and processes set out below. Hypercube 400 includes concepts 301-303, 404, 305-307, and 408 that make up an extremely simplified extended industry-layer balance sheet for a fictional airline entity "AirCo." Specifically, hypercube 400 includes XBRL "base" dimensions (date 301, entity 302, and currency 303); XBRL "extension" dimension (division 404); XBRL "base" measures or primary items (assets 305, current assets 306, and liabilities 307); and XBRL "extension" measure or primary item (airplane assets 408).

As the terms are used herein, an XBRL "base" dimension, "base" measure, or "base" taxonomy refers respectively to a dimension (as the term is expansively used herein), member, or taxonomy that is defined according to a specification that is used by many reporting entities, such as the XBRL specification itself, the XBRL Dimensions Specification, an industry-layer taxonomy, and the like. Contrastingly, as the terms are used herein, an XBRL "extension" dimension, "extension" measure, or "extension" taxonomy refers respectively to a dimension (as the term is expansively used herein), member, or taxonomy that is defined according to a standard developed or used by a particular reporting entity.

Figure 5:
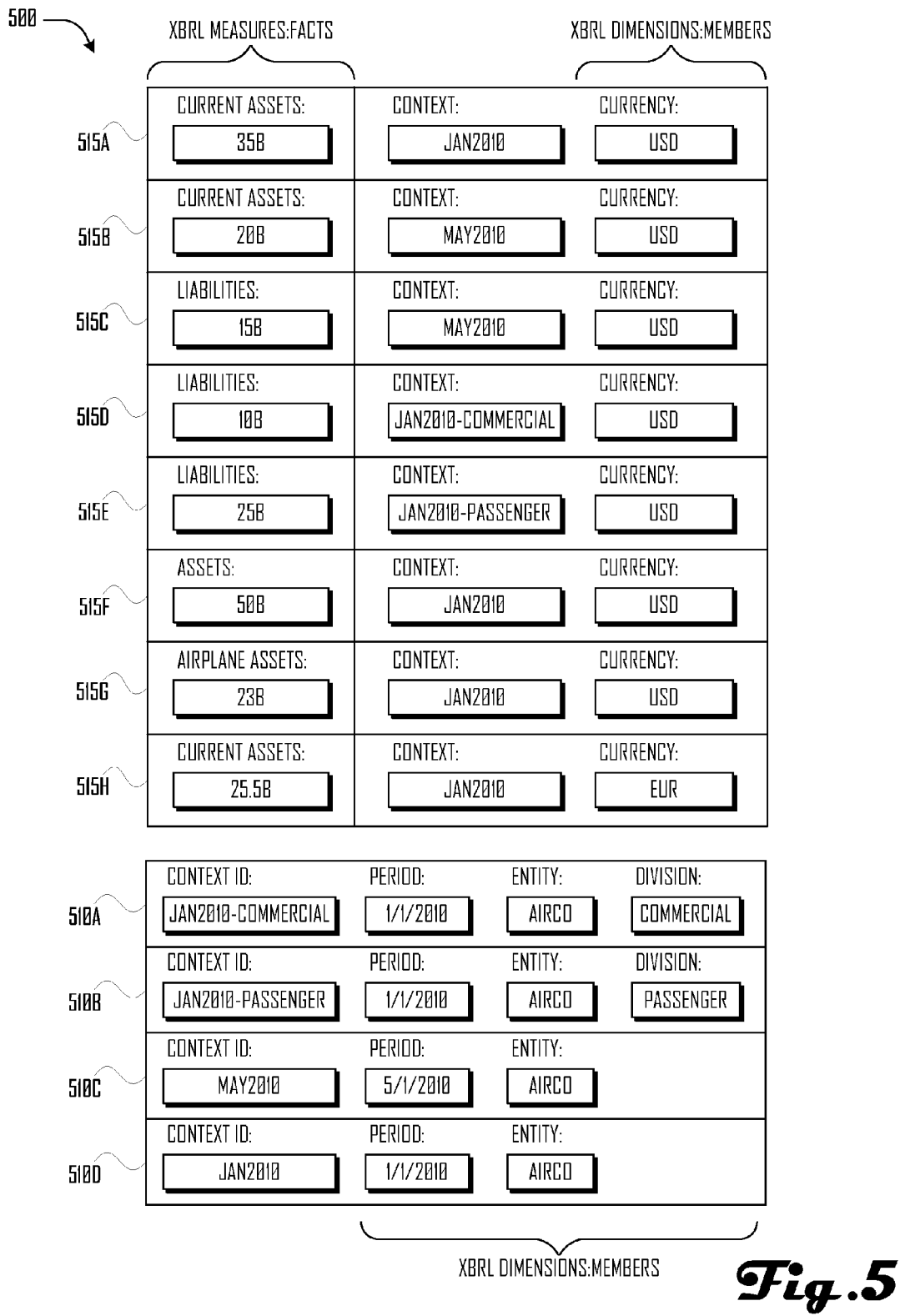
FIG. 5 illustrates data from an exemplary XBRL instance document, in accordance with one embodiment.

FIG. 5 illustrates data from an exemplary XBRL instance document 500 structured according to hypercube 400, in accordance with one embodiment. Contexts 510A-D define named combinations of XBRL dimension:member pairs. In the exemplary data, the "division" extension dimension has valid enumerated values of "commercial," "passenger," and "all" ("all" being the default value, which applies implicitly if no division is explicitly specified). For example, context Jan2010-Commercial 510A defines a combination of [period:1/1/2010; entity:AirCo; division:commercial]. Similarly, context Jan2010-Passenger 510B defines a combination of [period:1/1/2010; entity:AirCo; division: passenger]. Context Jan2010-Airplane 510C and Jan2010 510D both define a combination of [period:1/1/2010; entity:AirCo; division:all (implicit)].

The exemplary data, discussed above, includes several "explicit" dimensions (i.e., dimensions that have a set of enumerated members). However, some XBRL instance documents may also include values for "typed" dimensions, which have unbounded or non-enumerable values (e.g., an alphanumeric CustomerID). Such "typed" dimensions are not, strictly speaking, associated with particular "members." Rather, "typed" dimensions are, strictly speaking, associated with particular unrestricted "values." Nonetheless, the terms "dimension:member," "dimension:member pair," and the like, are used expansively herein to refer not only to literal dimension:member pairs (for explicit dimensions), but also to dimension:unrestricted-value pairs (for typed dimensions). In addition, as discussed below in reference to block 1018 of FIG. 10, the terms "dimension:member," "dimension:member pair," and the like, as used herein, also include tuple:index pairs.

Measure:fact pairs 515A-H are each associated with a specified combination of XBRL dimension:member pairs, including XBRL dimension:member pairs defined by one of contexts 510A-D plus a specified "currency" dimension. Thus, current assets:35 billion (515A) is associated with the dimension:member combination of [period:1/1/2010; entity: AirCo; division:all (implicit); currency:USD]. Current assets:20 billion (515B) is associated with the combination of [period:May 1, 2010; entity:AirCo; division:all (implicit); currency:USD]. Measure:fact pairs 515C-H are similarly associated with the indicated dimension:member combinations.

Figure 6:
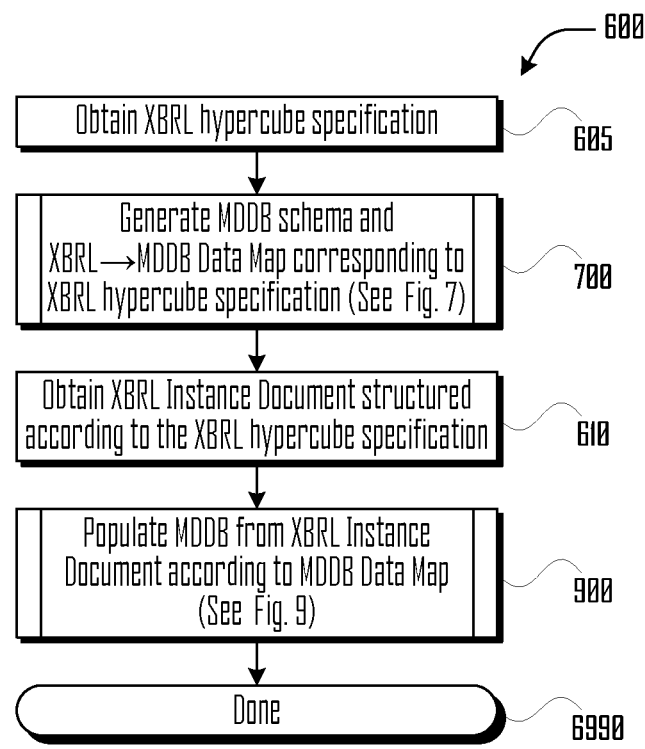
FIG. 6 illustrates a routine 600 for mapping XBRL data to a multidimensional database ("MDDB"), in accordance with one embodiment.

FIG. 6 illustrates a routine 600 for mapping XBRL data to a multidimensional database, in accordance with one embodiment. In block 605, routine 600 obtains an XBRL hypercube specification. As the term is used herein, an "XBRL hypercube specification" refers to an explicit or implicit hypercube definition, such as an XBRL definition linkbase (which explicitly defines an XBRL hypercube) and/or other XBRL taxonomy network or instance data that may implicitly define an XBRL hypercube. For example, in one embodiment, an XBRL hypercube may be implicitly defined by the set of concepts in a particular presentation tree (graph) for a particular network, even if those concepts are not associated with an explicit hypercube in that same network.

In subroutine block 700, routine 600 uses subroutine 700 (see FIG. 7, discussed below) to generate an MDDB schema and an XBRL→MDDB data map according to the XBRL hypercube specification obtained in block 605.

In block 610, routine 600 obtains an XBRL instance document structured according to the XBRL hypercube specification. And in subroutine block 900, routine 600 uses subroutine 900 (see FIG. 9, discussed below) to populate the MDDB with data from the XBRL instance document according to the XBRL→MDDB data map. Routine 600 ends in block 699.

Figure 7:
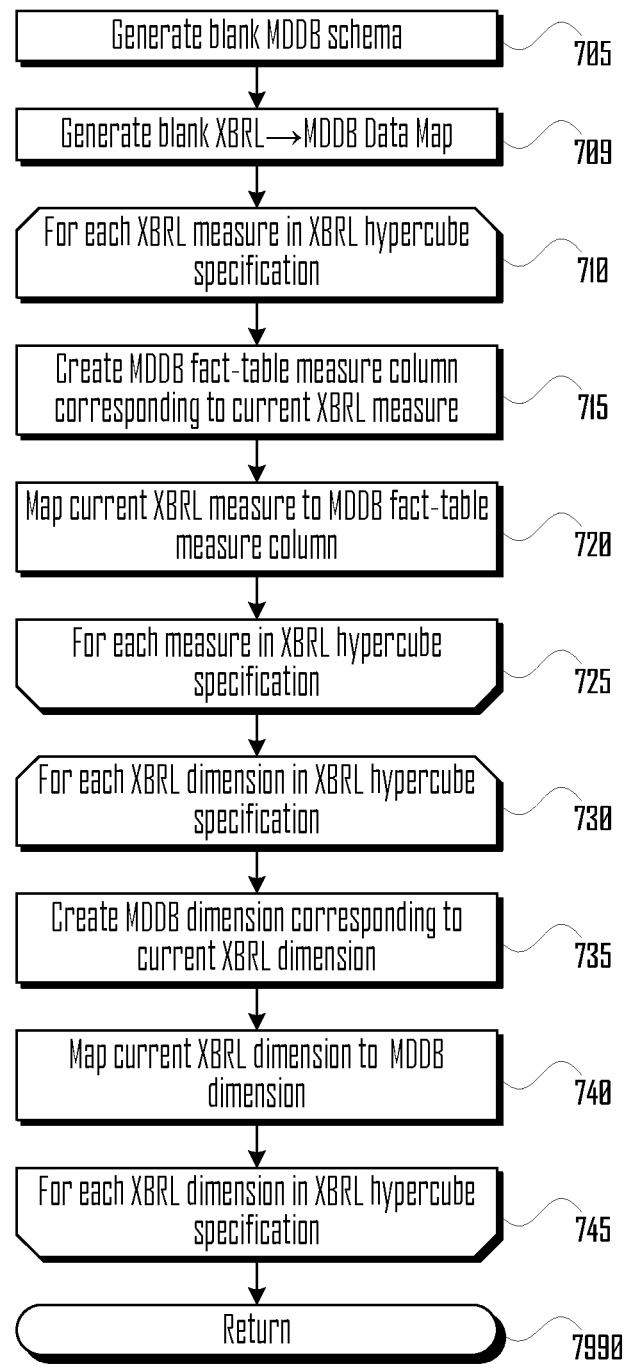
FIG. 7 illustrates a routine for mapping a base taxonomy network to an MDDB schema, in accordance with one embodiment.

FIG. 7 illustrates a subroutine 700 for mapping a given XBRL hypercube specification to an MDDB schema, such as may be performed by XBRL mapping server 200 in accordance with one embodiment. In some embodiments, subroutine 700 may be performed to generate an appropriately structured MDDB table for storing XBRL data from networks that extend a particular base taxonomy network.

For example, in one embodiment, subroutine 700 may be given a USFRTF taxonomy network, such as a Statement of Financial Position network from the us-gaap-ci taxonomy (or other industry-layer taxonomy), as an XBRL hypercube specification. For explanatory purposes, subroutine 700 will be described as being given an XBRL hypercube specification corresponding to hypercube 300.

Figures 13, 14:
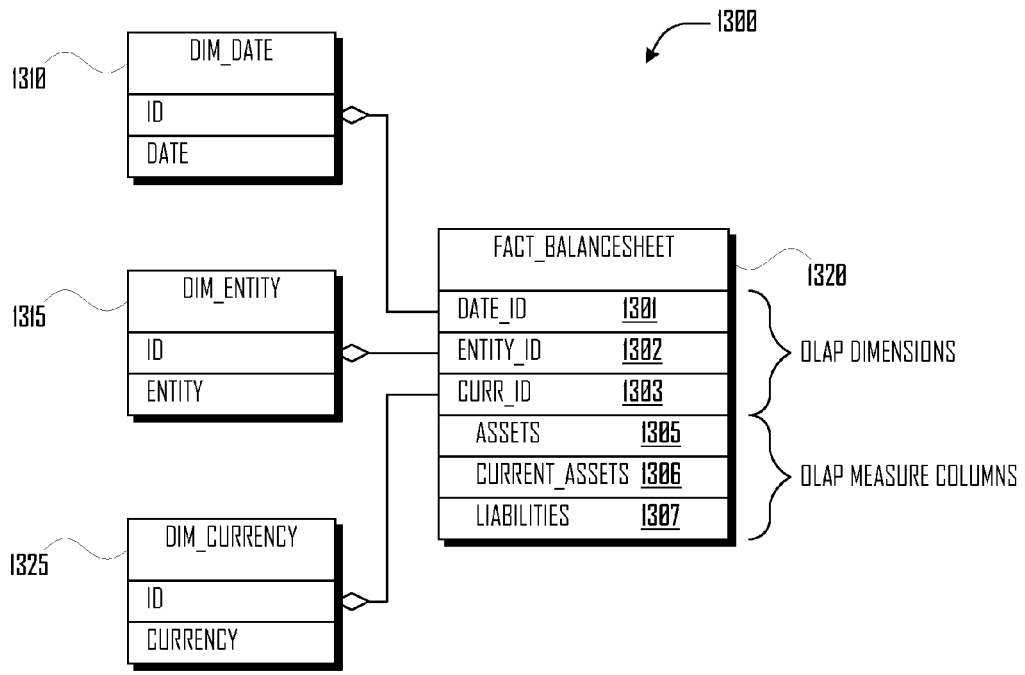
FIG. 13 illustrates an exemplary MDDB schema for implementing a multidimensional database according to the base taxonomy network corresponding to FIG. 3, in accordance with one embodiment.
FIG. 14 illustrates semantically unique contexts 1420A-C corresponding to XBRL instance document 500, in accordance with one embodiment.

In block 705, subroutine 700 creates a blank MDDB schema that will be structured to implement a multidimensional database for storing data structured according to the XBRL hypercube specification (or an extension thereof, such as entity-specific networks that extend a base taxonomy network). For example, FIG. 13 illustrates an exemplary MDDB schema 1300 for implementing such a multidimensional database according to the base taxonomy network corresponding to hypercube 300. MDDB schema 1300 shows the end result of subroutine 700; after block 708, the nascent schema may consist of nothing more than an empty fact table with no dimensions and no measure columns. Although MDDB schema 1300 shows a star-schema style arrangement of tables, in other embodiments, other multidimensional schemas (e.g., snowflake schema, Relational Online Analytical Processing schema, Multidimensional Online Analytical Processing schema, Hybrid Online Analytical Processing schema, or the like) may be employed.

Referring again to FIG. 7, in block 709, subroutine 700 creates a blank map for storing mappings between the XBRL hypercube specification and the MDDB schema that will be constructed as subroutine 700 progresses. In various embodiments, the map may comprise at various times a list, array, hash, XML data, or similar structure stored in transient or persistent memory; one or more database tables; or other like data structure.

For example, Table 1 (below) shows a (very small) portion of an exemplary XBRL→MDDB data map mapping a us-gaap taxonomy to an MDDB schema.

TABLE 1

Portion of an Exemplary XBRL→MDDB Data Map

```
<database schema="ci_soi">
    <xml-schema prefix="ci_soi">http://xbrl.fasb.org/us-gaap/2011/stm/us-gaap-stm-ci-soi-2011-01-31.xsd</xml-schema>
    <generated>2012-01-12T11:02:28.351-08:00</generated>
    <copyright>Copyright (c) 2010-2011, XBRL Cloud, Inc. All Rights Reserved.</copyright>
    <tables>
        <table load="true">
            <name>ft_us_gaap_statementtable_statementofincomestatemen0001</name>
            <extended-link>
                <uri>http://fasb.org/us-gaap/role/statement/StatementOfIncomeStatementTable</uri>
                <definition>124000 - Statement - Statement of Income (Including Gross Margin), Statement [Table]</definition>
            </extended-link>
            <hypercube>
                <qname>us-gaap:StatementTable</qname>
                <label>Statement [Table]</label>
            </hypercube>
            <dimensions>
                <dimension xbrl="document">
                    <schema>xbrl</schema>
                    <table>document</table>
                    <join-column>document_id</join-column>
                </dimension>
                <dimension xbrl="entity">
                    <schema>xbrl</schema>
                    <table>entity_identifier</table>
                    <join-column>entity_identifier_id</join-column>
                </dimension>
                <dimension xbrl="period">
                    <schema>xbrl</schema>
                    <table>period</table>
                    <join-column>period_id</join-column>
                </dimension>
                <dimension>
                    <schema>ci_soi</schema>
                    <table>mem_us_gaap_statementscenarioaxis0001</table>
                    <join-column>mem_us_gaap_statementscenarioaxis0001_id</join-column>
                    <qname>us-gaap:StatementScenarioAxis</qname>
                    <label>Statement, Scenario [Axis]</label>
                    <members>
                        <member default="true">
                            <qname>us-gaap:ScenarioUnspecifiedDomain</qname>
                            <label>Scenario, Unspecified [Domain]</label>
                        </member>
                    </members>
                </dimension>
            </dimensions>
            <measures>
                <measure>
                    <column>us_gaap_accretionexpense0001</column>
                    <qname>us-gaap:AccretionExpense</qname>
                    <label>Accretion Expense</label>
                    <datatype>monetary</datatype>
                </measure>
                <measure>
                    <column>us_gaap_admissionsrevenue0001</column>
                    <qname>us-gaap:AdmissionsRevenue</qname>
                    <label>Admissions Revenue</label>
                    <datatype>monetary</datatype>
                </measure>
                <measure>
                    <column>us_gaap_advertisingexpense0001</column>
                    <qname>us-gaap:AdvertisingExpense</qname>
                    <label>Advertising Expense</label>
                    <datatype>monetary</datatype>
                </measure>
                .
                .
                .
```

Beginning in starting loop block 710, subroutine 700 processes each measure defined in the XBRL hypercube specification obtained in block 705. For example, in the explanatory embodiment, subroutine 700 would process measures 305-307 in turn.

In block 715, subroutine 700 creates in the MDDB schema an MDDB measure column corresponding to the current measure. For example, in the explanatory embodiment, subroutine 700 may in one iteration process the measure "assets" 305 and add MDDB measure column 1305 to Fact_Balancesheet table 1320 of MDDB schema 1300.

In block 720, subroutine 700 maps the current base-taxonomy measure to the newly added MDDB measure column. For example, in the explanatory embodiment, subroutine 700 may in one iteration update the map created in block 709 to indicate that the measure "assets" 305 maps to MDDB measure column 1305.

In ending block 725, subroutine 700 loops back to block 710 to process the next measure defined in the base taxonomy network (if any).

Beginning in starting loop block 730, subroutine 700 processes each XBRL dimension (e.g., explicit dimension, typed dimension, tuple) defined in the XBRL hypercube specification obtained in block 705. For example, in the explanatory embodiment, subroutine 700 would process XBRL dimensions 301-303 in turn.

In block 735, subroutine 700 creates in the MDDB schema (if necessary) an MDDB dimension corresponding to the current XBRL dimension. In some embodiments, creating the MDDB dimension may comprise creating an MDDB dimension table and adding a primary key column to an MDDB fact table. For example, in the explanatory embodiment, subroutine 700 may in one iteration process the dimension "date" 301, creating dimension table 1310 and adding MDDB dimension 1301 to Fact_Balancesheet table 1320 of MDDB schema 1300. In some embodiments, the "blank" MDDB schema created in block 708 may actually include one or more "default" dimensions that may be present in every fact table. For example, in one embodiment, the "blank" MDDB schema created in block 708 may include one or more "built-in" context element "dimensions," as defined in the XBRL 2.1 Specification (e.g., "date," "entity," and/or "currency"). In such embodiments, block 735 may be skipped for dimensions that already exist in the MDDB schema.

After all XBRL base dimensions have been processed, rows of the MDDB fact table (e.g., table 1320) may have a multi-column or "compound" primary key consisting of one primary key column per MDDB dimension.

In block 740, subroutine 700 maps the current XBRL dimension to the newly added MDDB dimension. For example, in the explanatory embodiment, subroutine 700 may in one iteration update the map created in block 709 to indicate that the dimension "date" 301 maps to MDDB dimension 1301 and dimension table 1305.

In ending block 745, subroutine 700 loops back to block 730 to process the next dimension defined in the base taxonomy network (if any).

Subroutine 700 ends in block 799, having processed all dimensions and measures of the XBRL hypercube specification to create a corresponding MDDB schema. For example, in the explanatory embodiment, subroutine 700 may have created MDDB schema 1300.

Figure 8:
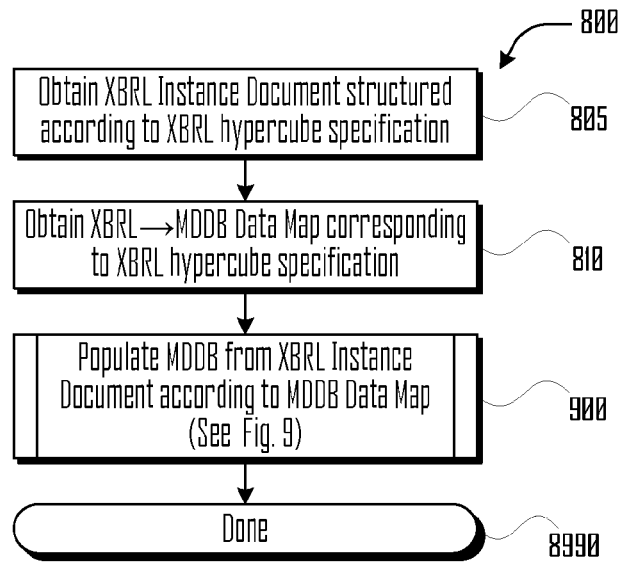
FIG. 8 illustrates a routine for mapping XBRL data from an extended-taxonomy instance document to an MDDB schema derived from a base-taxonomy network, in accordance with one embodiment.

FIG. 8 illustrates a routine 800 for mapping XBRL data structured according to a "reporting" XBRL hypercube specification (or from an extension of the reporting XBRL hypercube specification) to an MDDB schema derived from the reporting XBRL hypercube specification, such as may be performed by XBRL mapping server 200 in accordance with one embodiment. For example, in some embodiments, routine 800 may be performed to map financial reporting data from an XBRL extension taxonomy extended from a base "reporting" XBRL taxonomy into a previously structured, standardized multidimensional database (structured according to the base "reporting" XBRL taxonomy) for analysis and/or presentation. In some embodiments, such a standardized MDDB table may have been created according to subroutine 700, discussed above. In other embodiments, a standardized MDDB table may have been created manually or via other means.

In block 805, routine 800 obtains an XBRL instance document that is structured according to a reporting XBRL hypercube specification (or from an extension of the reporting XBRL hypercube specification), such as that obtained in block 605, discussed above in reference to FIG. 6. For example, in an explanatory embodiment, routine 800 obtains instance document 500 (as illustrated in FIG. 5), which is structured according to XBRL hypercube specification 400 (as illustrated in FIG. 4), which is an extension of a "reporting" XBRL hypercube specification 300 (as illustrated in FIG. 3). In other embodiments, the instance document obtained in block 805 may be structured according to the "reporting" XBRL hypercube specification itself (as opposed to an extension thereof).

In block 810, routine 800 obtains an XBRL→MDDB map mapping the "reporting" XBRL hypercube specification (e.g., XBRL hypercube specification 300) to the MDDB schema.

In subroutine block 900 (see FIG. 9, discussed below), routine 800 populates a multidimensional database with data from the XBRL instance document according to the XBRL→MDDB map. Routine 800 ends in block 89.

Figure 9:
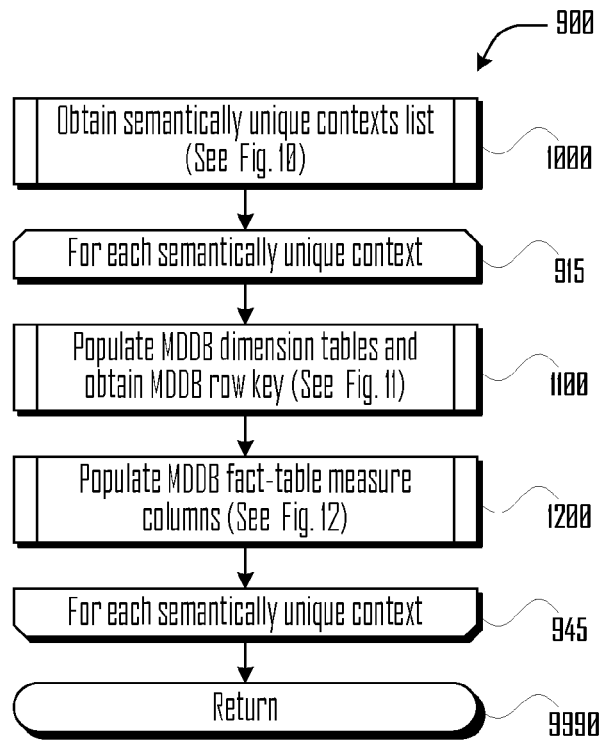
FIG. 9 illustrates a subroutine 900 for populating a given multidimensional database with data from a given XBRL instance document according to a given XBRL→MDDB map.

FIG. 9 illustrates a subroutine 900 for populating a given multidimensional database with data from a given XBRL instance document according to a given XBRL→MDDB map.

In subroutine block 1000 (see FIG. 10, discussed below), routine 900 obtains a list of semantically unique contexts that are associated with facts in the XBRL instance document. As the term is used herein, a "semantically unique context" refers to a particular combination of dimension:member pairs that may be associated with one or more measure:fact pairs in an XBRL instance document. In some embodiments, many context and unit elements are semantically identical. For example, XBRL instance document 500, illustrated in FIG. 5, includes semantically unique contexts 1420A-C, as illustrated in FIG. 14.

Beginning in starting loop block 915, routine 900 processes each semantically unique context. For example, in the explanatory embodiment, routine 900 may in one iteration process semantically unique context 1420A.

In subroutine block 1100 (see FIG. 11, discussed below), routine 900 populates MDDB dimension tables (if necessary) according to the current semantically unique context and obtains a key to a row in the MDDB fact table row that corresponds to the current semantically unique context. As discussed above, in one embodiment, the MDDB fact table, e.g., table 1320, may have a multi-column or "compound" primary key consisting of one primary key column per MDDB dimension. Thus, using the dimension:member pairs referred to in the current semantically unique context, subroutine 1100 can identify a compound primary key for a row in the MDDB fact table. For example, in the explanatory embodiment, subroutine 1100 may in one iteration map semantically unique context 1420A to a compound primary key, <date_ID=1001, entity_ID=1001, curr_ID=1001>, which identifies row 1525B in MDDB fact table 1520. In some cases, one or more components of a compound primary key may be NULL. For example, in some embodiments, every fact table may include a "currency" MDDB dimension, but there may be cases in which measures described in an MDDB fact table row are not currencies (e.g., a "Number of outstanding shares" measure). In such cases, the currency dimension component of the compound primary key for such rows may be a NULL value. Alternatively, some embodiments may deal with such cases by adding a "none" row to one or more MDDB dimension tables (e.g., MDDB dimension tables 1505, 1510, 1515).

In subroutine block 1200, routine 900 populates one or more MDDB measure columns of the MDDB row identified in subroutine block 1100. For example, in the explanatory embodiment, routine 900 may in one iteration populate the MDDB measure columns "assets" and "current assets" of row 1525B in MDDB fact table 1520 with the values 50B (see XBRL measure:fact pair 515F) and 35B (see XBRL measure:fact pair 515A), respectively. Some XBRL instance documents may include more than one measure value for a given semantically unique context (and, thus, for a given MDDB fact table row). In some embodiments, duplicate measure values for a given semantically unique context may be discarded and not populated to a corresponding MDDB measure column of an MDDB row.

In ending loop block 945, routine 900 loops back to block 915 to process the next semantically unique context (if any). Once all semantically unique contexts have been processed, routine 900 ends in block 999.

Figure 10:
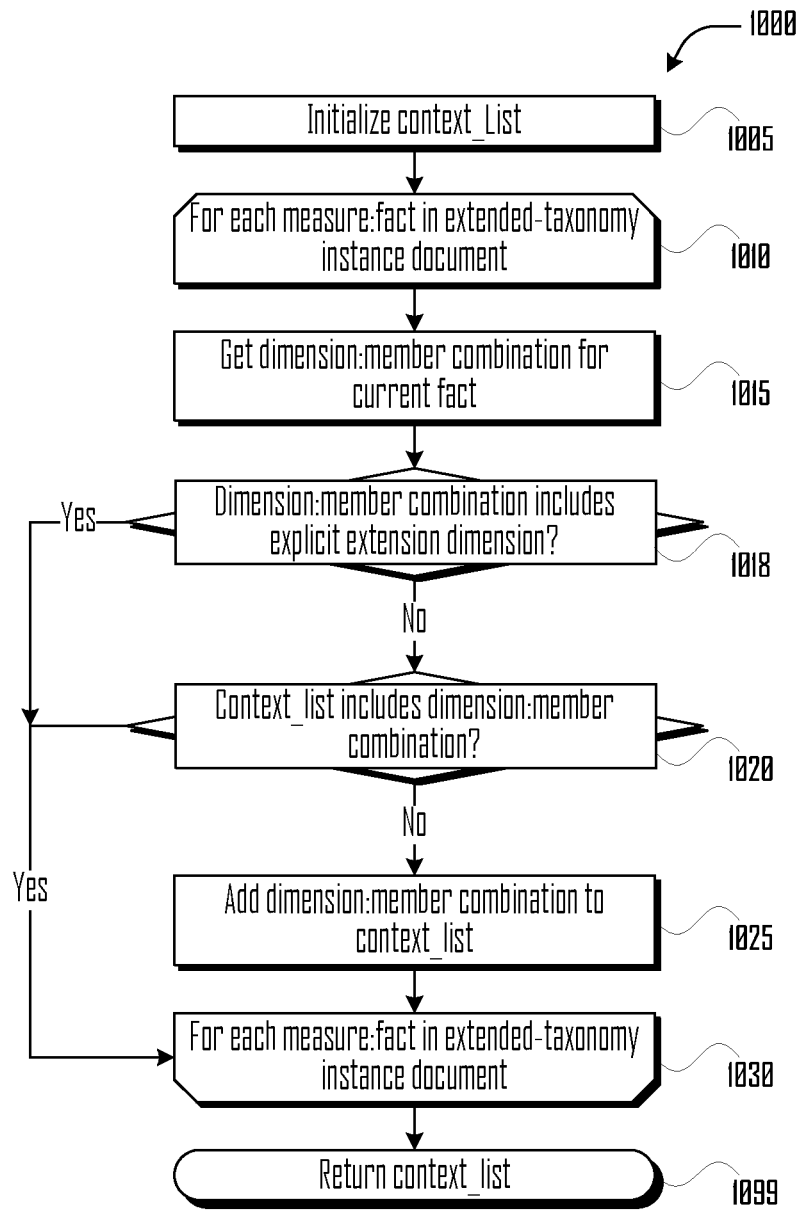
FIG. 10 illustrates a subroutine for determining a list of semantically unique contexts from an extended-taxonomy XBRL instance document, in accordance with one embodiment.

FIG. 10 illustrates a subroutine 1000 for determining a list of semantically unique contexts from a given XBRL instance document, in accordance with one embodiment. For example, in an explanatory embodiment, subroutine 1000 processes XBRL instance document 500.

In block 1005, subroutine 1000 initializes a data structure for storing the list of semantically unique contexts ("context_list"). In various embodiments, the context_list data structure may comprise at various times an array, hash, or similar structure stored in transient or persistent memory; one or more database tables; or other like data structure.

Beginning in opening loop block 1010, subroutine 1000 processes each measure:fact pair in the XBRL instance document. For example, in an explanatory embodiment, subroutine 1000 processes in various iterations measure:fact pairs 515A-H.

In block 1015, subroutine 1000 gets the combination of dimension:member pairs that are associated with the current measure:fact pair. For example, in one iteration of an explanatory embodiment, subroutine 1000 processes measure:fact pair 515A, which is associated with the dimension:member combination of [period:1/1/2010; entity:AirCo; division:all (implicit); currency:USD]. In another iteration of an explanatory embodiment, subroutine 1000 processes measure:fact pair 515D, which is associated with the combination of [period:1/1/2010; entity:AirCo; division:commercial (explicit); currency:USD].

In some embodiments, dimension:member combination may include one or more dimension:member pairs (as those terms are expansively used herein) derived from a tuple. For example, an XBRL instance document may, in come cases, include one or more tuples such as those illustrated in Table 2 (below). Such an instance document could include multiple departments, each with multiple directors.

TABLE 2

Exemplary tuples

```
<department>
    <director>
        <directorName context=Jan2010>Binstock</directorName>
    </director>
    <director>
        <directorName context=Jan2010>Milnes</directorName>
    </director>
</department>
```

The examplary tuple data includes a top-level tuple ("department"), which encloses two nested "director" tuples, which respectively include the measure:fact pairs directorName:Binstock and directorName:Milnes.

Both measure:fact pairs are associated with the Jan2010 context. As discussed above, the Jan2010 context defines a combination of [period:1/1/2010; entity:AirCo; division:all (implicit)]. However, when a fact is included in a tuple, the fact's context also includes dimension:member pairs (where both "dimension" and "member" are used expansively) corresponding to each enclosing tuple. Specifically, in one embodiment, the tuple's tag or "QName" (e.g., "department" or "director") is paired with an index derived from each enclosing tuple's position within its parent element.

For example, assuming that the tuple with the tag of "department" (above) were the first tuple with that tag to appear in its enclosing instance document, then that tuple may be assigned an index of, for example, "1" (although index numbering could also start with "0" or any other number). In other embodiments, rather than assigning an index to each tuple, some other arbitrary identifier may be generated or derived for each tuple.

Thus, the directorName:Binstock measure:fact would be associated in one embodiment with the following dimension:member combination: [period:1/1/2010; entity:AirCo; division:all (implicit); director: 1; department: 1]. Similarly, the directorName:Milnes measure:fact would be associated in one embodiment with the following dimension:member combination: [period:1/1/2010; entity:AirCo; division:all (implicit); director:2; department:1]. In such embodiments, the tuple:index pairs would be handled the same way as any other "dimension:member" pair (as those terms are expansively used herein).

In decision block 1018, subroutine 1000 determines whether the current dimensions:members combination includes an explicit extension dimension (a dimension that is not included in the given XBRL hypercube specification and whose member is not the default member for that dimension), segregating explicit extension dimensions that are not to be mapped from non-explicit-extension dimensions that are to be mapped.

If subroutine 1000 determines that the current dimensions:members combination does include an explicit extension dimension, then subroutine 1000 does not process the current dimensions:members combination any further, skipping to ending loop block 1030 and proceeding to process the next dimensions:members combination (if any). For example, in one iteration of an explanatory embodiment, subroutine 1000 processes measure:fact pair 515D, whose dimensions:members combination explicitly includes an extension dimension ("division") with a non-default value ("commercial"). In this case, subroutine 1000 skips to ending loop block 1030 from decision block 1018.

On the other hand, in decision block 1018, subroutine 1000 may determine that the current dimensions:members combination does not include an explicit extension dimension. For example, in another iteration of an explanatory embodiment, subroutine 1000 processes measure:fact pair 515A, whose dimensions:members combination includes no extension dimensions with a non-default value. In this case, subroutine 1000 proceeds to decision block 1020.

In decision block 1020, subroutine 1000 determines whether the context_list initialized in block 1005 includes an entry corresponding to the current dimensions:members combination. If subroutine 1000 has, on a previous iteration, processed a dimensions:members combination that is identical to the current dimensions:members combination, then context_list would already include a corresponding entry, and subroutine 1000 skips to ending loop block 1030 and proceeds to process the next dimensions:members combination (if any).

On the other hand, if the current dimensions:members combination has not been processed on a previous iteration, then in block 1025, subroutine 1000 adds an entry corresponding to the current dimensions:members combination to context_list.

In closing loop block 1030, subroutine 1000 iterates back to block 1010 to process the next measure:fact pair in the extended-taxonomy XBRL instance document (if any). Once all measure:fact pairs have been processed, subroutine 1000 ends in block 1099, returning context_list to the caller.

Figure 11:
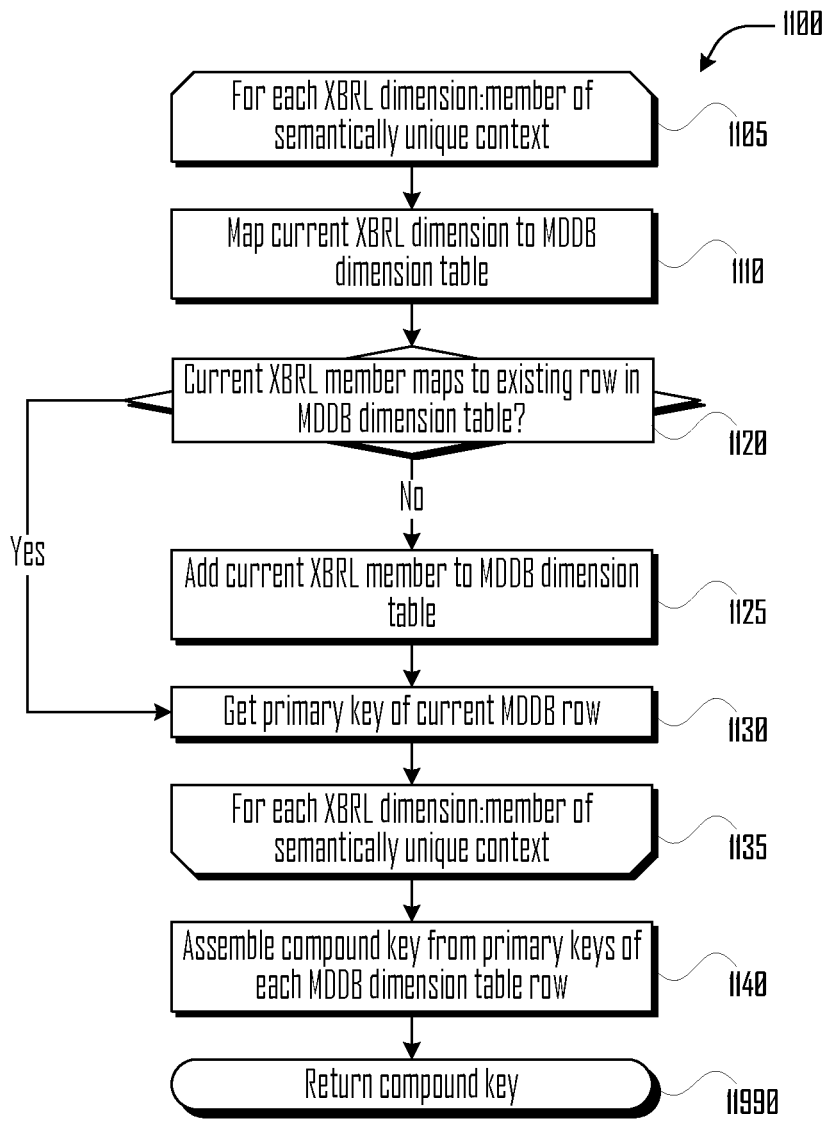
FIG. 11 illustrates a subroutine for populating MDDB dimension tables and obtaining an MDDB row key, in accordance with one embodiment.

FIG. 11 illustrates a subroutine 1100 for populating MDDB dimension tables and obtaining an MDDB row key, given a semantically unique context, in accordance with one embodiment. For example, in an explanatory embodiment, subroutine 1100 processes semantically unique context 1420A.

Beginning in opening loop block 1105, subroutine 1100 processes each dimension:member pair of the semantically unique context. For example, in an explanatory embodiment, subroutine 1100 processes each of the following dimension: member pairs of semantically unique context 1420A: currency:USD; period:1/1/2010; entity:AIRCO.

Figure 15:
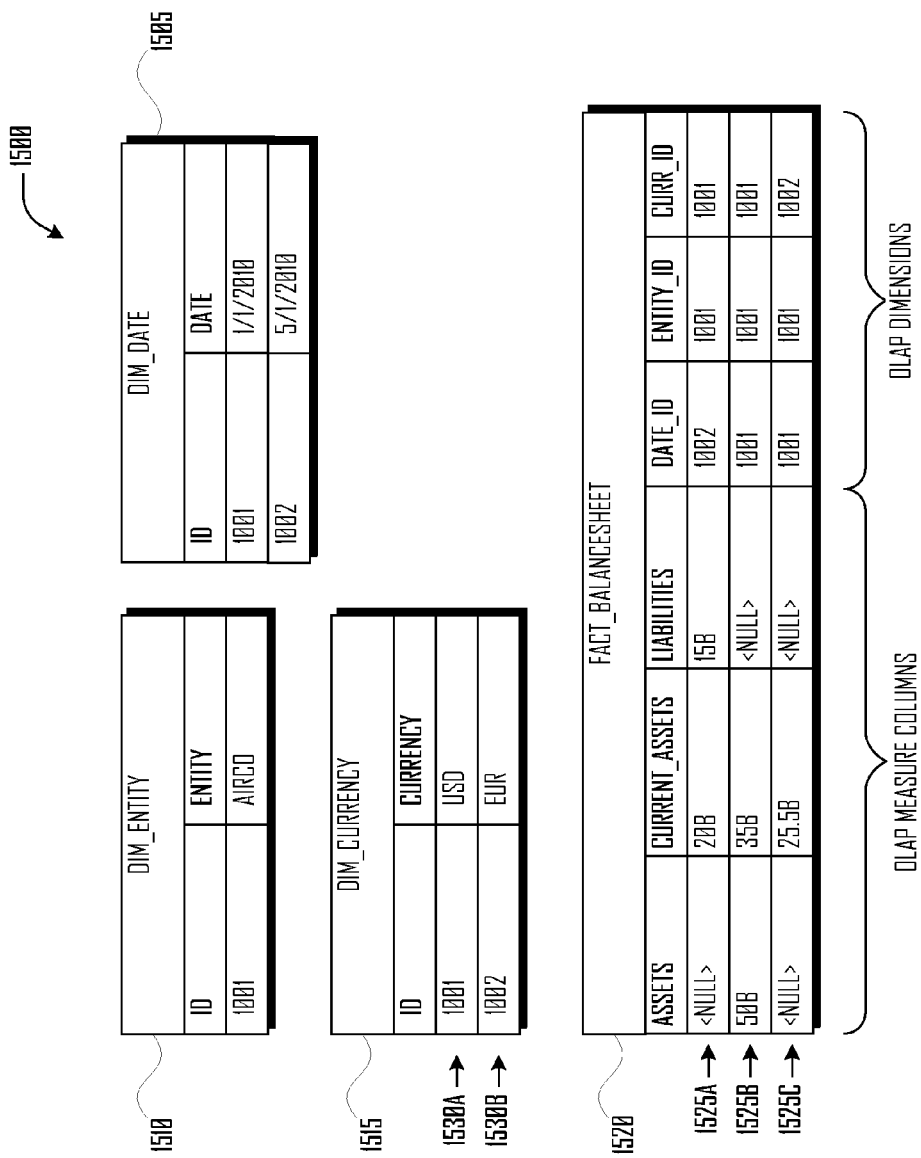
FIG. 15 illustrates a multidimensional database 1500 comprising an MDDB fact table 1520 and associated MDDB dimension tables 1505, 1510, 1515, the multidimensional database 1500 being structured according to MDDB schema 1300 and storing data corresponding to exemplary XBRL instance document 500, in accordance with one embodiment.

In block 1110, subroutine 1100 maps the current XBRL dimension to an MDDB dimension table. For example, in an explanatory embodiment, subroutine 1100 determines that the "currency" dimension maps to MDDB dimension table dim_currency 1515, as illustrated in FIG. 15.

In decision block 1120, subroutine 1100 determines whether the current XBRL member (e.g., "USD") maps to an existing row in the MDDB dimension table (e.g., dim_currency 1515). If no such row exists, then in block 1125, subroutine 1100 adds a row corresponding to the current XBRL member to the MDDB dimension table. For example, in an explanatory embodiment, subroutine 1100 adds row 1530A to MDDB dimension table dim_currency 1515.

Once an MDDB dimension table row corresponding to the current XBRL member has been added (if necessary), subroutine 1100 obtains the primary key for the MDDB dimension table row. For example, in an explanatory embodiment, subroutine 1100 obtains the primary key 1101 for row 1530A.

In closing loop block 1135, subroutine 1100 iterates back to block 1105 to process the next XBRL dimension:member pair (if any) of the semantically unique context. Once all dimension:member pairs have been processed, subroutine 1100 assembles a compound primary key from each of the primary keys obtained in iterations of block 1130. Such a compound primary key identifies a particular row in an MDDB fact table. For example, in an explanatory embodiment, subroutine 1100 obtains the compound primary key, <date_ID=1001, entity_ID=1001, curr_ID=1001>. This compound primary key identifies row 1525B of MDDB fact table 1520.

Subroutine 1100 ends in block 1199, returning the compound primary key to the caller.

Figure 12:
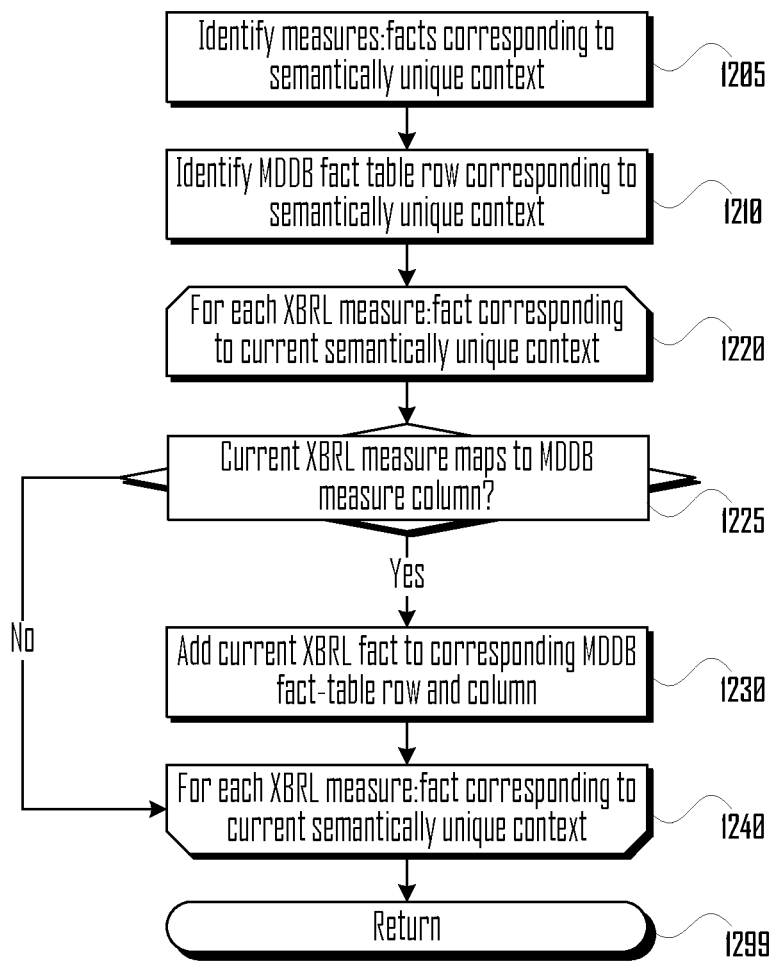
FIG. 12 illustrates a subroutine 1200 for populating MDDB measure columns of an MDDB fact table, given a semantically unique context, in accordance with one embodiment.

FIG. 12 illustrates a subroutine 1200 for populating MDDB measure columns of an MDDB fact table, given a semantically unique context and an XBRL instance document, in accordance with one embodiment. For example, in an explanatory embodiment, subroutine 1200 processes semantically unique context 1420A.

In block 1205, subroutine 1200 identifies a set of one or more measure:fact pairs in an XBRL instance document that corresponds to the semantically unique context. For example, in an explanatory embodiment, given semantically unique context 1420A, subroutine 1100 identifies measure:fact pair 515A, measure:fact pair 515F, and measure:fact pair 515G.

In block 1210, subroutine 1200 identifies a row in an MDDB fact table, the row corresponding to the semantically unique context. For example, in an explanatory embodiment, subroutine 1200 may obtain a compound primary key, such as <date_ID=1001, entity_ID=1001, curr_ID=1001>. This compound primary key identifies row 1525B of MDDB fact table 1520.

Beginning in opening loop block 1220, subroutine 1200 processes each measure:fact pair in the set of measure:fact pairs identified in block 1205.

In decision block 1225, subroutine 1200 determines whether the measure of the current measure:fact pair maps to an MDDB measure column in an MDDB fact table, thereby segregating mapped measure:fact pairs from non-mapped measure:fact pairs. If the current measure:fact pair is not mapped, then subroutine 1200 skips to block 1240 and proceeds to process the next measure:fact pair (if any). Thus, in some embodiments, the multidimensional database may be populated exclusively with mapped facts.

For example, in one iteration of an explanatory embodiment, subroutine 1200 processes measure:fact pair 515G (airplane assets:23B), determining that the measure "airplane assets" does not map to any of the MDDB measure columns in MDDB fact table 1430 (as the measure "airplane assets" is not included in the base industry-layer taxonomy). In this case, subroutine 1200 does not populate the MDDB fact table row with the fact, 23B.

On the other hand, if in decision block 1225, subroutine 1200 determines that the measure of the current measure:fact pair maps to an MDDB measure column in an MDDB fact table, then in block 1230, subroutine 1200 populates that MDDB measure column in the row identified in block 1210 with the fact of the current measure:fact pair. For example, in one iteration of an explanatory embodiment, subroutine 1200 processes measure:fact pair 515A (current assets:35B), determining that the measure "current assets" maps to the "current_assets" MDDB measure column in MDDB fact table 1430. In this case, in block 1230, subroutine 1200 populates the "current_assets" MDDB measure column of fact table row 1525B with the fact, 35B.

In closing loop block 1240, subroutine 1200 iterates back to block 1220 to process the next measure:fact pair (if any) in the set of measure:fact pairs identified in block 1205. Having processed the set of measure:fact pairs identified in block 1205, subroutine 1200 ends in block 1299. In some cases, even after all measure:fact pairs have been processed, some MDDB measure columns in some rows may remain unpopulated or NULL valued (e.g., rows 1525A-C, as illustrated in FIG. 15).

Once an MDDB schema has been mapped for a particular "reporting" XBRL hypercube specification, then XBRL instance document filings that extend the reporting XBRL hypercube specification may be mapped to a multidimensional database, as discussed above. Accordingly, even though several different XBRL filings may each extend a base XBRL taxonomy network in different ways, certain key performance indicators ("KPIs") may nonetheless be determined, analyzed, and/or presented across the several different XBRL filings.

Figure 16:
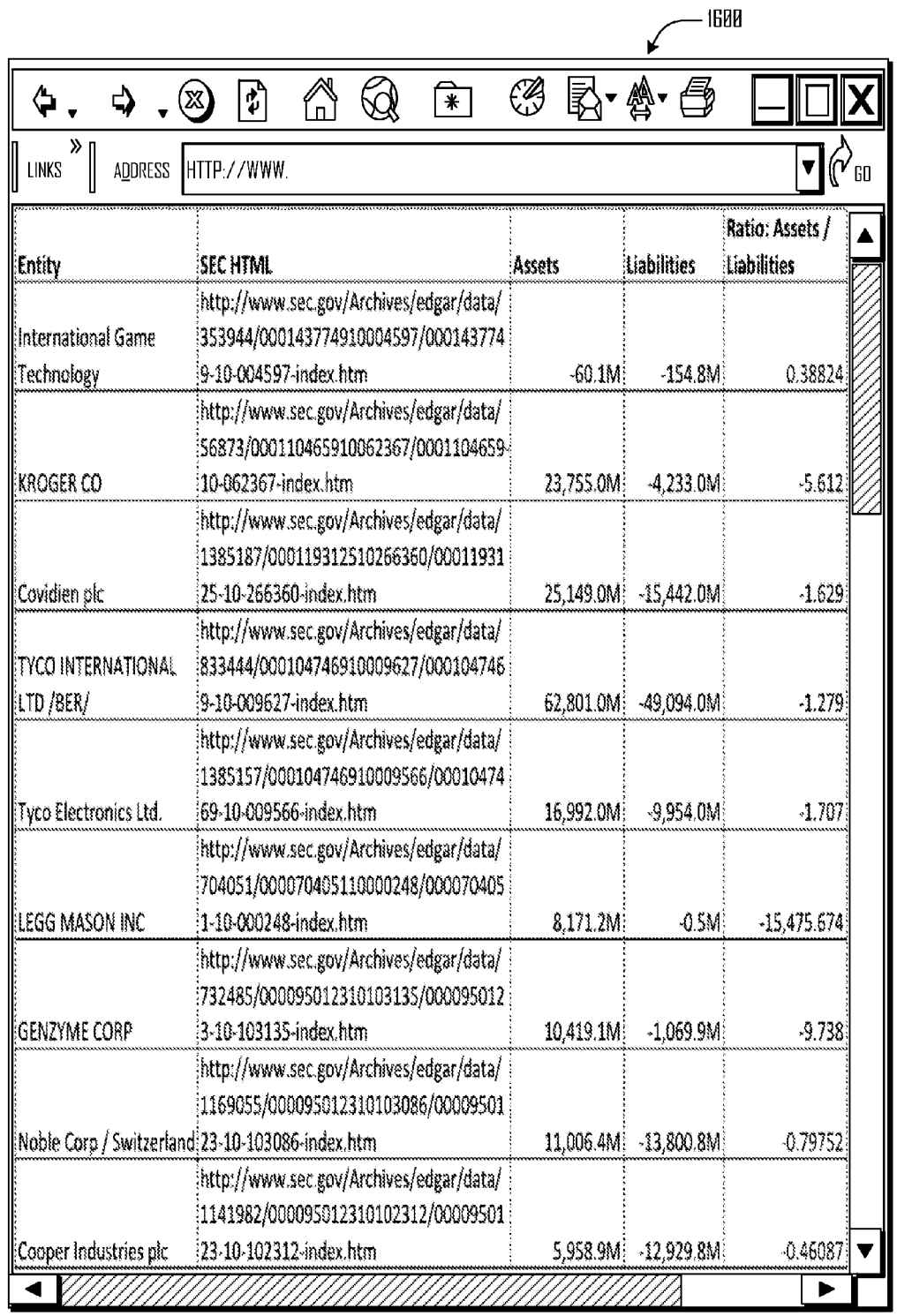
FIG. 16 shows an example of an inter-filing KPI display, in accordance with one embodiment.

For example, FIG. 16 shows one simple example of an inter-filing KPI display 1600, in accordance with one embodiment. Display 1600 shows Assets and Liabilities values extracted from SEC filings of various commercial-industry entities, such as may be determined after those SEC filings have been mapped to a multidimensional database, as discussed above. Display 1600 further shows a KPI ratio (Assets/Liabilities) computed from the Assets and Liabilities values. Thus, it is possible to compare certain metrics across entities by disregarding each entity's individual extensions to a base XBRL taxonomy network.

Similarly, a multidimensional database that has been populated with data from an XBRL instance document can be subsequently used for various forms of online analytical processing and/or business intelligence analysis in various embodiments. Such embodiments may further automatically generate cube meta-data (e.g., a cube definition describing the structure of the multidimensional database), reports (e.g., flat tables, pivot tables, and the like), and/or dashboards (e.g., product sales over time) to facilitate analysis of the MDDB data with a given analysis tool. For example, one embodiment may automatically generate business intelligence reports and/or dashboards reporting each dimension by date. Another embodiment may automatically generate business intelligence reports and/or dashboards reporting, for example, the top or bottom N dimensions (or a user-selected set of dimensions) by date.

In some embodiments, such automatically generated business intelligence reports and/or dashboards may take the form of XML documents similar to the exemplary XML shown in Table 3. Such configuration documents may be generated in a manner similar to those for generating XBRL→MDDB maps, as described above. For example, in one embodiment, a routine similar to subroutine 700 (see FIG. 7, discussed above) may be adapted to generate meta-data and/or configuration documents for a given business tool instead of or in addition to generating a XBRL→MDDB map, as shown.

TABLE 3

Exemplary auto-generated business intelligence tool configuration document

```
<bi-tool-format>
    <cube name="Product">
        <dimensions>
            <dimension name="date" type="date">
                <members>
                    <member>2010-01-01</member>
                    <member>2010-04-01</member>
                </members>
            </dimension>
            <dimension name="product" type="string">
                <members>
                    <member>Cookies</member>
                    <member>Crackers</member>
                </members>
            </dimension>
            <dimension name="region" type="string">
                <members>
```

TABLE 3-continued

Exemplary auto-generated business intelligence tool configuration document

```
                    <member>US</member>
                    <member>EU</member>
                </members>
            </dimension>
        </dimensions>
        <measures>
            <measure name="Quantity" type="integer" />
            <measure name="Price" type="monetary" />
            <measure name="ShippingCost" type="monetary" />
            <measure name="Tax" type="monetary" />
            <measure name="InvoiceAmount" type="monetary" />
        </measures>
    </cube>
    <!-- Report likely to be same as or subset of data structure -->
    <report name="Product1">
        <dimensions>
            <dimension name="date" type="date">
                <members>
                    <member>2010-01-01</member>
                    <member>2010-04-01</member>
                </members>
            </dimension>
            <dimension name="product" type="string">
                <members>
                    <member>Cookies</member>
                    <member>Crackers</member>
                </members>
            </dimension>
            <dimension name="region" type="string">
                <members>
                    <member>US</member>
                    <member>EU</member>
                </members>
            </dimension>
        </dimensions>
        <measures>
            <measure name="Quantity" type="integer" />
            <measure name="Price" type="monetary" />
            <measure name="ShippingCost" type="monetary" />
            <measure name="Tax" type="monetary" />
            <measure name="InvoiceAmount" type="monetary" />
        </measures>
    </report>
    <!-- Chart is typically two dimensions; and small-n sums/counts
    <chart name="ProductByDate">
        <dimensions>
            <dimension name="date" type="date">
                <members>
                    <member>2010-01-01</member>
                    <member>2010-04-01</member>
                </members>
            </dimension>
            <dimension name="product" type="string">
                <members>
                    <member>Cookies</member>
                    <member>Crackers</member>
                </members>
            </dimension>
        </dimensions>
        <measures>
            <measure name="Quantity" type="sum(quantity)" />
        </measures>
    </chart>
    <chart name="ProductByRegion">
        <dimensions>
            <dimension name="product" type="string">
                <members>
                    <member>Cookies</member>
                    <member>Crackers</member>
                </members>
            </dimension>
            <dimension name="region" type="string">
                <members>
                    <member>US</member>
                    <member>EU</member>
                </members>
            </dimension>
```

TABLE 3-continued

Exemplary auto-generated business intelligence
tool configuration document

```
        </dimensions>
        <measures>
            <measure name="InvoiceAmount"
            type="sum(InvoiceAmount)" />
        </measures>
    </chart>
</bi-tool-format>
```

Figure 17:
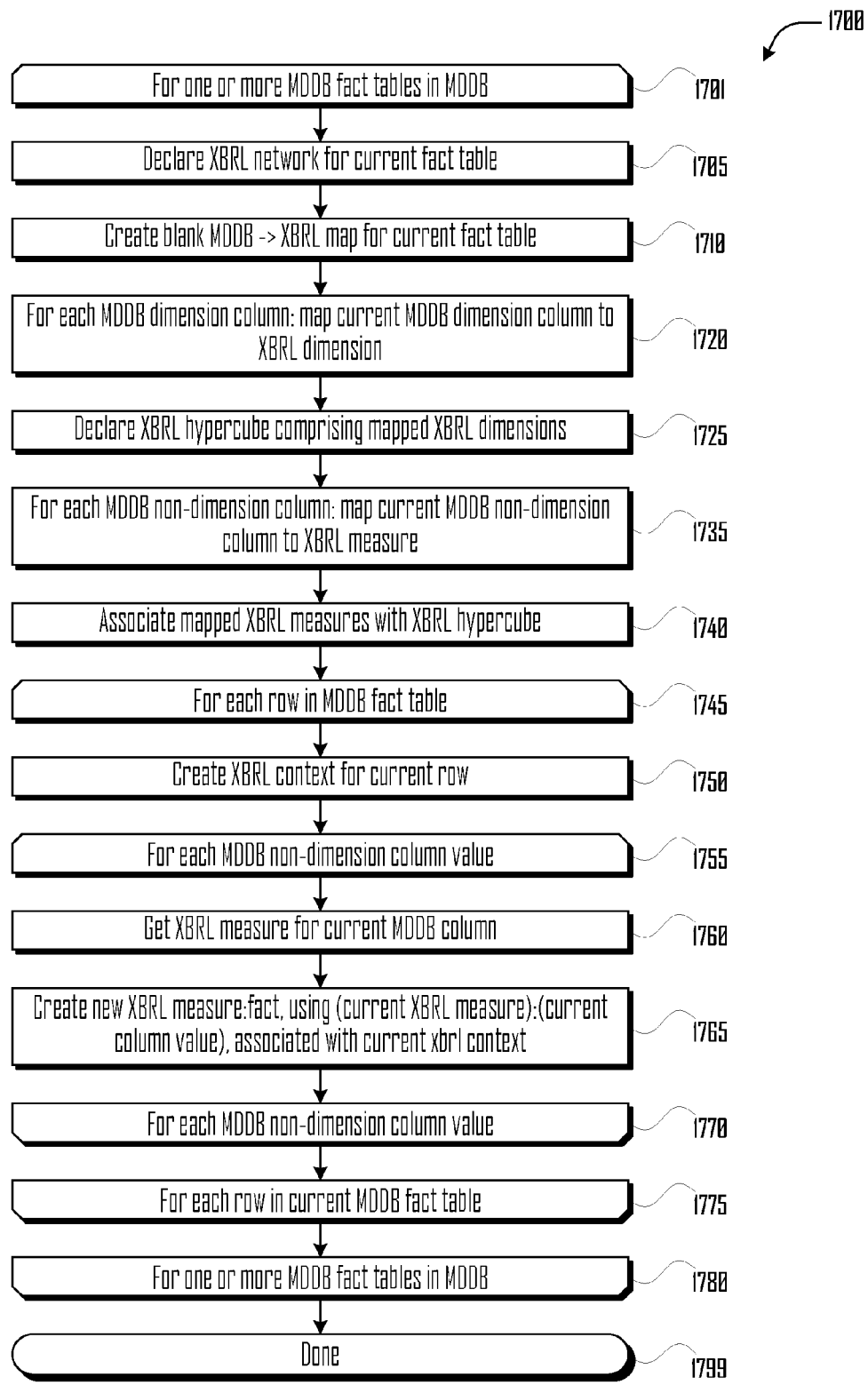
FIG. 17 illustrates a routine for mapping an MDDB fact table to XBRL data, in accordance with one embodiment.

FIG. 17 illustrates a routine 1700 for mapping data in a multidimensional database to XBRL data, in accordance with one embodiment. In starting loop 1701, routine 1700 processes one or more fact tables from a multidimensional database. In block 1705, routine 1700 declares an XBRL network for the current MDDB fact table. In various embodiments, the MDDB fact table may include any kind of data (financial or non-financial), and the schema of the MDDB fact table may or may not correspond to any existing XBRL taxonomy. In some embodiments, the name of the declared XBRL network may correspond to or be derived from the name of the MDDB fact table. In alternate embodiments, rather than declaring one XBRL network for each MDDB fact table, multiple MDDB fact tables may instead map to different XBRL hypercubes in one XBRL network.

In block 1710, routine 1700 creates a blank map for storing mappings between the MDDB schema of the current MDDB fact table and an XBRL taxonomy that will be constructed for the current XBRL network as routine 1700 progresses. In various embodiments, the map may comprise at various times a list, array, hash, XML data, or similar structure stored in transient or persistent memory; one or more database tables; or other like data structure. In some embodiments, a single map data structure may be used to hold mappings for multiple MDDB fact tables/XBRL networks.

In block 1720, routine 1700 adds an entry to the map associating the MDDB dimension column with an XBRL dimension. In some embodiments, the XBRL dimension may be a typed XBRL dimension. In other embodiments, the XBRL dimension may be an explicit XBRL dimension, in which case, routine 1700 may further declare members for the explicit dimension, members whose QNames correspond to entries in the MDDB dimension table corresponding to the current MDDB dimension column. In still other embodiments, routine 1700 may determine whether to declare a typed or explicit XBRL dimension according to the quantity of entries in the corresponding MDDB dimension table and/or other factors.

In some embodiments, one or more of the XBRL "dimensions" (as the term is expansively used herein) may be implemented as an XBRL tuple. For example, in one embodiment, routine 1700 might determine that the MDDB dimension table corresponding to an MDDB dimension includes only a primary key column or that the MDDB dimension table lacks a column for storing member names. In such an embodiment, routine 1700 might implement that MDDB dimension as an XBRL tuple.

In block 1725, routine 1700 declares an XBRL hypercube comprising a set of XBRL dimensions that map back to the MDDB dimension columns.

In block 1735, for each MDDB non-dimension column of the MDDB schema corresponding to the MDDB fact table, routine 1700 adds an entry to the map associating the MDDB non-dimension column with a corresponding XBRL measure or primary item. In block 1740, routine 1700 associates the mapped XBRL measures or primary items with the XBRL hypercube declared in block 1725.

Beginning in opening loop block 1745, routine 1700 processes each row of the MDDB table. In block 1750, routine 1700 declares an XBRL context corresponding to the compound primary key of the current MDDB row. In opening loop block 1755, routine 1700 processes each non-dimension-column value of the current row.

In block 1760, routine 1700 identifies (according to the XBRL→MDDB map) the XBRL measure or primary item that corresponds to the current non-dimension MDDB column. In block 1765, routine 1700 adds a new measure:fact to the XBRL hypercube and associates the new measure:fact with the current XBRL context for the current MDDB row. The measure of the new measure:fact is the XBRL measure identified in block 1760. The fact value of the new measure:fact is the current non-dimension-column value.

In closing loop block 1770, routine 1700 iterates back to block 1755 to process the next non-dimensional-column value of the current row (if any). In closing loop block 1775, routine 1700 iterates back to block 1745 to process the next row of the MDDB fact table (if any). In closing loop block 1780, routine 1700 closes the XBRL hypercube and network corresponding to the current MDDB fact table and iterates back to block 1755 to process the next fact table (if any) of the multidimensional database. Routine 1700 ends in block 1799.

Although specific embodiments have been illustrated and described herein, a whole variety of alternate and/or equivalent implementations may be substituted for the specific embodiments shown and described without departing from the scope of the present invention. For example, although the systems and methods described herein are described using examples from USFRTF industry-layer XBRL taxonomy networks, other embodiments may function equally as well when applied to other base XBRL taxonomy networks that may be individually extended by several entities. This application is intended to cover any adaptations or variations of the embodiments discussed herein.

What is claimed is:

1. A computer-implemented method for mapping an eXtensible Business Reporting Language ("XBRL") hypercube specification to a multidimensional database schema, the method comprising:

obtaining, by the computer, a reporting hypercube specification comprising a plurality of "mapped" XBRL dimensions and a plurality of "mapped" XBRL measures of the XBRL hypercube specification;

generating, by the computer, a database schema defining a multidimensional database corresponding to the XBRL hypercube specification, said multidimensional database comprising a fact table and a plurality of dimension tables, said fact table comprising a plurality of measure columns and a plurality of dimension columns corresponding respectively to said plurality of dimension tables; and generating, by the computer, a data map mapping each of said plurality of mapped XBRL dimensions to a corresponding one of said plurality of dimension tables, said data map further mapping each of said plurality of mapped XBRL measures to a corresponding one of said plurality of measure columns.

2. The method of claim 1, further comprising:

obtaining an XBRL instance document comprising a plurality of mapped multidimensional business facts structured according to said plurality of mapped XBRL measures and said plurality of mapped XBRL dimensions; and using said data map, populating said multidimensional database with said plurality of mapped multidimensional business facts.

3. The method of claim 2, wherein said XBRL instance document further comprises a plurality of non-mapped multidimensional business facts explicitly structured according to one or more non-mapped XBRL dimensions and/or non-mapped XBRL measures of the XBRL hypercube specification; and wherein the method further comprises segregating said plurality of mapped multidimensional business facts from said plurality of non-mapped multidimensional business facts.

4. The method of claim 3, wherein the XBRL hypercube specification comprises an XBRL taxonomy network that is an extension of a base business-reporting taxonomy network, wherein said plurality of mapped XBRL dimensions and said plurality of mapped XBRL measures are defined in said base business-reporting taxonomy network, and wherein said one or more non-mapped XBRL dimensions and/or non-mapped XBRL measures are not defined in said base business-reporting taxonomy network.

5. The method of claim 3, wherein said multidimensional database is populated exclusively with said plurality of mapped multidimensional business facts according to said plurality of mapped XBRL measures and said plurality of mapped XBRL dimensions.

6. The method of claim 1, wherein the XBRL hypercube specification comprises an XBRL taxonomy network that is an extension of a base taxonomy network, and wherein said reporting hypercube specification comprises said base taxonomy network.

7. The method of claim 1, wherein the XBRL hypercube specification comprises an XBRL financial-reporting taxonomy network for a given industry, and wherein said plurality of mapped XBRL dimensions and said plurality of mapped XBRL measures are associated with key performance indicators in said given industry.

8. The method of claim 1, further comprising generating a cube definition describing a structure of said multidimensional database, said cube definition facilitating use of said multidimensional database by a business intelligence tool.

9. The method of claim 1, wherein said plurality of "mapped" XBRL dimensions comprise a typed XBRL dimension, an explicit XBRL dimension, and an XBRL tuple.

10. The method of claim 1, wherein the XBRL hypercube specification comprises an XBRL definition linkbase explicitly defining said plurality of "mapped" XBRL dimensions and said plurality of "mapped" XBRL measures.

11. The method of claim 1, wherein obtaining said reporting hypercube specification comprises inferring, by the computer, an implicit hypercube specification based on XBRL taxonomy data or XBRL instance data.

12. The method of claim 11, wherein inferring said implicit hypercube specification comprises identifying XBRL concepts in a presentation linkbase that are not associated with an explicit XBRL hypercube explicitly defined in an XBRL taxonomy network.

13. A non-transient computer-readable storage medium having stored thereon instructions that, when executed by a processor, configure the processor to perform the method of claim 1.

14. A computing apparatus comprising a processor and a memory storing instructions that, when executed by the processor, configure the apparatus to perform the method of claim 1.

15. A computer-implemented method for mapping eXtensible Business Reporting Language ("XBRL") data to a multidimensional database ("MDDB") comprising an MDDB fact table and a plurality of MDDB dimension tables, the MDDB fact table comprising a plurality of MDDB measure columns and a plurality of MDDB dimension columns corresponding respectively to the plurality of MDDB dimension tables, the method comprising:

obtaining an XBRL instance document comprising a plurality of multidimensional business facts structured according to a plurality of XBRL measures and a plurality of XBRL dimensions;

obtaining, by the computer, a data map mapping each of said plurality of XBRL dimensions to a corresponding one of the plurality of MDDB dimension tables, said data map further mapping each of said plurality of XBRL measures to a corresponding one of said plurality of MDDB measure columns; and using said data map, populating said MDDB with said plurality of multidimensional business facts.

16. The method of claim 15, wherein populating said MDDB with said plurality of mapped multidimensional business facts comprises:

determining a plurality of unique dimension:member combinations that are associated with said plurality of mapped multidimensional business facts in said XBRL instance document; and using said data map, determining a plurality of fact-table compound keys respectively corresponding to said plurality of unique dimension:member combinations, said plurality of fact-table compound keys respectively identifying a plurality of rows of said fact table.

17. The method of claim 16, wherein populating said multidimensional database with said plurality of mapped multidimensional business facts further comprises, for each given row of said plurality of rows of said fact table, populating the given row with one or more business facts that are associated in said XBRL instance document with a dimension:member combination that maps to a fact-table compound key that identifies the given row.

18. The method of claim 16, wherein determining said plurality of fact-table compound keys comprises, for each given dimension:member of said plurality of unique dimension:member combinations:

mapping the given dimension to a corresponding dimension table of said plurality of dimension tables;

mapping the given member to a corresponding row of said corresponding dimension table; and determining a primary key of said corresponding row of said corresponding dimension table.

19. A non-transient computer-readable storage medium having stored thereon instructions that, when executed by a processor, configure the processor to perform the method of claim 15.

20. A computing apparatus comprising a processor and a memory storing instructions that, when executed by the processor, configure the apparatus to perform the method of claim 15.

21. A computer-implemented method for mapping a multidimensional database to an eXtensible Business Reporting Language ("XBRL") hypercube, the method comprising:

obtaining, by the computer, the multidimensional database, the multidimensional database comprising a fact table and a plurality of dimension tables, said fact table comprising a plurality of compound primary keys corresponding to a plurality of rows, each row having a plurality of non-dimension column values corresponding to a plurality of non-dimension columns, each primary key comprising a plurality of dimension column values corresponding to a plurality of dimension columns;

declaring, by the computer, an XBRL network corresponding to said fact table;

declaring, by the computer, an XBRL hypercube associated with said XBRL network, said XBRL hypercube comprising a plurality of XBRL dimensions and a plurality of XBRL measures, said plurality of XBRL dimensions mapping respectively to said plurality of dimension columns, said plurality of XBRL measures mapping respectively to said plurality of non-dimension columns; and for each of said plurality of rows, the computer:
generating an XBRL context mapped to a given compound primary key of a given row; and
adding to said XBRL hypercube a plurality of measure:fact pairs associated with said generated XBRL context, each of the plurality of measure:fact pairs having a measure corresponding to a given non-dimension column of said plurality of non-dimension columns, and having a face corresponding to a non-dimension column value corresponding to the given non-dimension column and the given row.

22. The method of claim 21, wherein declaring said XBRL hypercube comprises:
determining whether to declare a given XBRL dimension of said plurality of XBRL dimensions as a typed XBRL dimension or an explicit XBRL dimension according to a count of entries in a dimension table corresponding to a dimension column to which the given XBRL dimension is mapped.

23. The method of claim 21, wherein declaring said XBRL hypercube comprises:
determining to declare a given XBRL dimension of said plurality of XBRL dimensions as an explicit XBRL dimension; and
declaring a plurality of XBRL dimension members corresponding respectively to a plurality of entries in a dimension table corresponding to a dimension column to which the given XBRL dimension is mapped.

24. The method of claim 21, wherein declaring said XBRL hypercube comprises:
determining whether a given dimension table of said plurality of dimension tables includes a dimension-table column for storing member names; and
based at least in part on whether said given dimension table includes said dimension-table column, determining to declare a given XBRL dimension of said plurality of XBRL dimensions as an XBRL tuple, the given XBRL dimension being mapped to the given dimension table.

25. The method of claim 21, wherein declaring said XBRL network comprises determining a name of said XBRL network based at least on part on a name of said fact table in the multidimensional database.

26. A non-transient computer-readable storage medium having stored thereon instructions that, when executed by a processor, configure the processor to perform the method of claim 21.

27. A computing apparatus comprising a processor and a memory storing instructions that, when executed by the processor, configure the apparatus to perform the method of claim 21.

* * * * *